US010487645B2

United States Patent
DePavia et al.

(10) Patent No.: US 10,487,645 B2
(45) Date of Patent: Nov. 26, 2019

(54) SYSTEM AND METHOD FOR REDUCING RIG NOISE TRANSMITTED DOWNHOLE

(71) Applicant: SCHLUMBERGER TECHNOLOGY CORPORATION, Sugar Land, TX (US)

(72) Inventors: Luis Eduardo DePavia, Sugar Land, TX (US); David Kirk Conn, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 433 days.

(21) Appl. No.: 15/199,364

(22) Filed: Jun. 30, 2016

(65) Prior Publication Data
US 2017/0122041 A1 May 4, 2017

Related U.S. Application Data

(60) Provisional application No. 62/249,636, filed on Nov. 2, 2015.

(51) Int. Cl.
*E21B 47/12* (2012.01)
*E21B 17/02* (2006.01)
*H04L 27/227* (2006.01)
*H04B 13/02* (2006.01)

(52) U.S. Cl.
CPC .......... *E21B 47/122* (2013.01); *E21B 17/028* (2013.01); *H04B 13/02* (2013.01); *H04L 27/2273* (2013.01)

(58) Field of Classification Search
CPC ...... E21B 47/12; E21B 47/122; E21B 17/028; H04B 13/02; H04L 27/227
See application file for complete search history.

(56) References Cited

U.S. PATENT DOCUMENTS

| | | | |
|---|---|---|---|
| 5,084,678 | A | 1/1992 | Hutin |
| 5,749,605 | A | 5/1998 | Hampton, III et al. |
| 6,515,592 | B1 | 2/2003 | Babour et al. |
| 8,400,326 | B2 | 3/2013 | Codazzi |
| 8,890,710 | B2 | 11/2014 | Rodney |
| 2004/0089444 | A1 | 5/2004 | Demny et al. |
| 2004/0206510 | A1 | 10/2004 | Fraser et al. |
| 2011/0006773 | A1 | 1/2011 | Bittar |

(Continued)

FOREIGN PATENT DOCUMENTS

| | | |
|---|---|---|
| AU | 2014200665 A1 | 2/2014 |
| GB | 2421752 A | 7/2006 |

(Continued)

OTHER PUBLICATIONS

International Search Report and Written Opinion issued in International Patent application PCT/US2016/059254 dated Jan. 18, 2017. 15 pages.

(Continued)

*Primary Examiner* — Michael R Wills, III

(57) ABSTRACT

A saver sub includes a hollow, tubular body having an upper portion and a lower portion. The upper portion is coupled to a kelly or a top drive, and the lower portion is coupled to a drill string. An insulation layer is positioned between the upper portion and the lower portion.

25 Claims, 9 Drawing Sheets

(56) References Cited

U.S. PATENT DOCUMENTS

| | | | |
|---|---|---|---|
| 2014/0049036 A1* | 2/2014 | Miller | F16L 25/021 |
| | | | 285/48 |
| 2014/0265304 A1* | 9/2014 | MacDonald | E21B 47/122 |
| | | | 285/47 |
| 2016/0061027 A1 | 3/2016 | Gao et al. | |
| 2016/0108724 A1 | 4/2016 | Jarrot | |
| 2016/0194953 A1* | 7/2016 | Switzer | E21B 17/003 |
| | | | 340/854.6 |
| 2017/0114632 A1* | 4/2017 | Orban | E21B 47/122 |
| 2018/0216457 A1* | 8/2018 | Derkacz | E21B 47/122 |

FOREIGN PATENT DOCUMENTS

| | | |
|---|---|---|
| RU | 2224887 C1 | 2/2004 |
| RU | 65133 U1 | 7/2007 |
| SU | 994704 A1 | 2/1983 |
| WO | 2014085936 A1 | 6/2014 |
| WO | 2014089490 A1 | 6/2014 |
| WO | WO2014134741 A1 | 9/2014 |

OTHER PUBLICATIONS

International Preliminary Report on Patentability issued in International Patent application PCT/US2016/059254, dated May 8, 2019, 11 pages.

Office Action and Search Report issued in Russian Patent Application 2018118972/03 dated Apr. 5, 2019, 17 pages.

Office Action and Search Report issued in Russian Patent Application 2018118972/03 dated Aug. 15, 2019, 17 pages.

\* cited by examiner

SYSTEM AND METHOD FOR REDUCING RIG NOISE TRANSMITTED DOWNHOLE

CROSS-REFERENCE TO RELATED APPLICATIONS

This application claims the benefit of U.S. Provisional Patent Application having Ser. No. 62/249636, filed on Nov. 2, 2015, entitled "System and Method for Reducing Rig Noise Transmitted Downhole," the disclosure of which is incorporated by reference herein in its entirety.

BACKGROUND

A downhole measurement-while-drilling ("MWD") tool that transmits measurement data uphole using electromagnetic ("EM") telemetry includes an electrical insulation layer (e.g., ceramic, hard plastic, rubber) positioned between an upper portion of the tool and a lower portion of the tool. To transmit the data from within a wellbore to the surface, a coding method is used. For example, a predetermined carrier frequency is selected, and a PSK or QPSK coding is superposed to define a bit pattern. This coded signal is applied as a voltage differential between the upper and lower portions of the tool. Due to the voltage differential, current is generated that travels through the subterranean formation. More particularly, the current travels from the lower portion of the tool, out into the subterranean formation, and bends back toward the upper portion of the tool, in an almost semi-elliptical shape.

Two sensors (e.g., metallic stakes) are driven into the subterranean formation at the surface. When a portion of the current reaches the stakes, a voltage differential is generated across the stakes, as the surface formation has some electrical resistivity. A computer system at the surface then decodes the voltage differential to recover the measurement data that was transmitted from the downhole tool in the wellbore.

Equipment (e.g., electrical motors, generators, control equipment, etc.) located at the surface may be electrically-connected to a drill string and/or a casing in the wellbore. For example, the equipment may be electrically-connected to the drill string and/or the casing through metallic structural components that are part of the drilling rig. As a result, current from the equipment may be transmitted into the wellbore via the drill string and/or the casing. This current may be introduced into the subterranean formation and affect (e.g., interfere with) the telemetry measurements obtained by the stakes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A saver sub includes a hollow, tubular body having an upper portion and a lower portion. The upper portion is coupled to a kelly or a top drive, and the lower portion is coupled to a drill string. An insulation layer is positioned between the upper portion and the lower portion.

A casing includes a hollow, tubular body that is coupled to a wall of a wellbore with a layer of cement. The body includes an upper portion and a lower portion. An insulation layer is positioned between the upper portion and the lower portion.

A drill string segment includes a hollow, tubular body having an upper portion and a lower portion. The upper portion is coupled to a saver sub, a kelly, or a top drive. An insulation layer is positioned between the upper portion and the lower portion.

A method for recovering data from a downhole tool in a first wellbore is also disclosed. The method includes measuring an electromagnetic field using first and second sensors. At least a portion of the electromagnetic field is transmitted by the downhole tool positioned in the first wellbore. The first and second sensors are each positioned in contact with a casing in a second wellbore. The casing includes an insulation layer that is positioned above the first and second sensors. The electromagnetic field measured between the first and second sensors is then decoded to recover a property measured by the downhole tool.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to obscure aspects of the embodiments.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
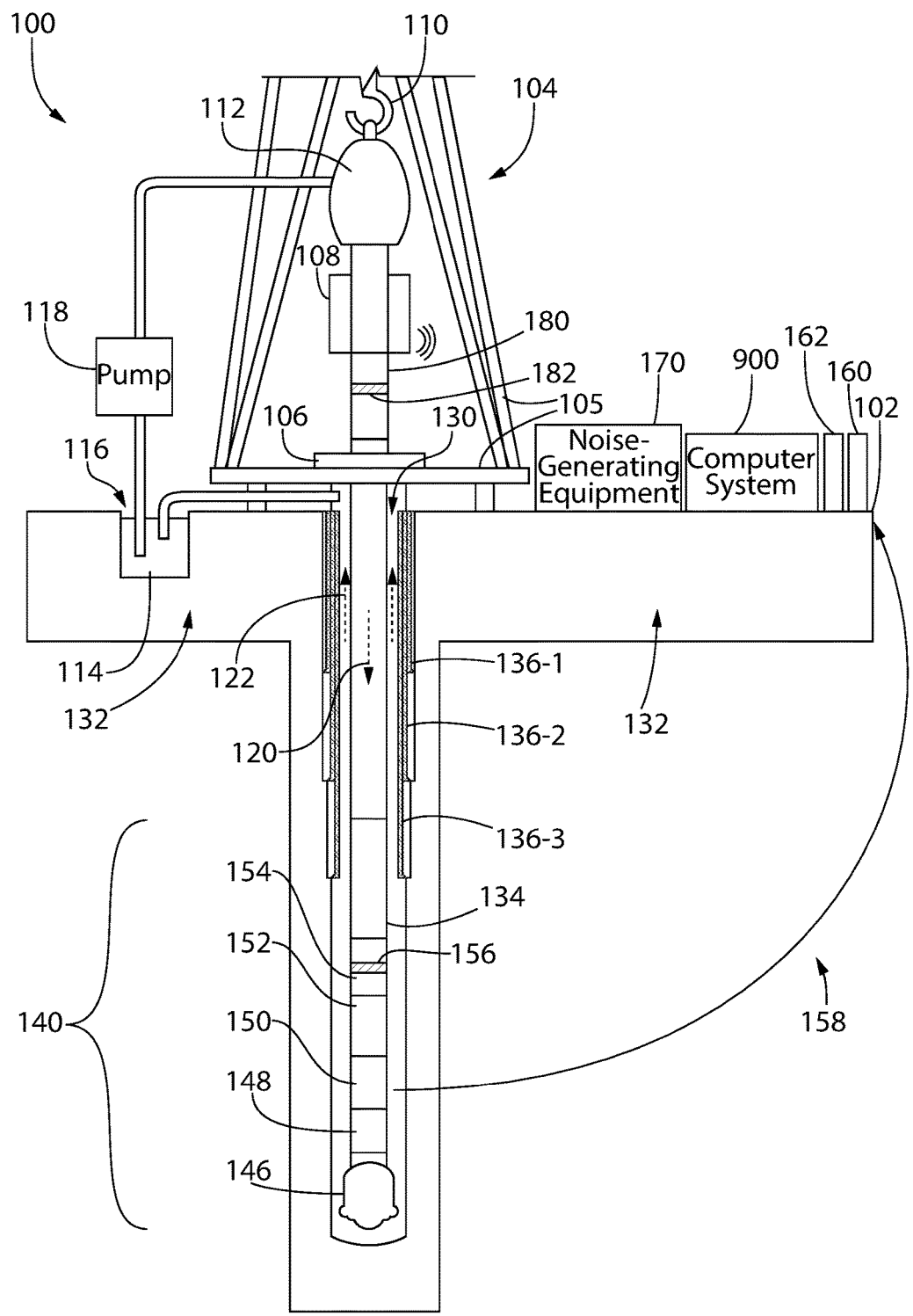
FIG. 1 illustrates a cross-sectional view of a well site system including an electrical insulation layer positioned in a saver sub, according to an embodiment.

FIG. 1 illustrates a cross-sectional view of a well site system 100, according to an embodiment. The well site system 100 may include a platform and derrick assembly 104 positioned over a wellbore 130 that is formed in a subterranean formation 132. The platform and derrick assembly 104 may include a rotary table 106, a kelly or top drive 108, a hook 110, and a rotary swivel 112. A drill string 134 may be supported by the hook 110 and extend down into the wellbore 130. The drill string 134 may include a body that is a hollow, metallic tubular member. The rotary table 106 may generate rotary motion that is transmitted through the kelly or top drive 108 to the drill string 134, causing the drill string 134 to rotate within the wellbore 130. The swivel 112 may allow the drill string 134 to rotate with respect to the hook 110.

Drilling fluid or mud 114 may be stored in a pit 116 at the well site. A pump 118 may deliver the drilling fluid 114 to the interior of the drill string 134 via a port in the swivel 112, which causes the drilling fluid 114 to flow downwardly through the drill string 134, as indicated by the directional arrow 120. The drilling fluid exits the drill string 134 via ports in a drill bit 146, and then circulates upwardly through the annulus region between the outside of the drill string 134 and a wall of the wellbore 130, as indicated by the directional arrows 122. In this known manner, the drilling fluid lubricates the drill bit 146 and carries formation cuttings up to the surface 102 as it is returned to the pit 116 for recirculation.

A downhole tool 140 may be coupled to a lower end of the drill string 134. The downhole tool 140 may be or include a bottom hole assembly ("BHA"). The downhole tool 140 may include the drill bit 146, a rotary steerable system ("RSS") 148, and a motor 150. The downhole tool 140 may also include a logging-while-drilling ("LWD") tool 152 and a measurement-while-drilling ("MWD") tool 154. The LWD tool 152 may be configured to measure one or more formation properties and/or physical properties as the wellbore 130 is being drilled or at any time thereafter. The MWD tool 154 may be configured to measure one or more physical properties as the wellbore 130 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 152 may be sent to the MWD tool 154. The MWD tool 154 may then group the sets of data from the LWD tool 152 and the MWD tool 154 and prepare the data for transmission to the surface 102 after proper encoding.

The downhole tool 140 may also include an electrical insulation layer 156 positioned between an upper portion of the downhole tool 140 and a lower portion of the downhole tool 140. The insulation layer 156 may be positioned within the LWD tool 152, within the MWD tool 154 (as shown), or elsewhere in the downhole tool 140. The downhole tool 140 may transmit data (e.g., formation properties, physical properties, etc.) from within the wellbore 130 up to a computer system 900 at the surface 102 using electromagnetic telemetry. To transmit the digital data stream from within the wellbore 130 to the surface 102, a coding method may be used. More particularly, a predetermined carrier frequency is selected, and a PSK or QPSK or any other modulation coding is superposed to define the bit pattern. This coded signal is applied as a voltage differential between the upper and lower portions of the downhole tool 140 across the insulation layer 156. Due to the voltage differential between the upper and lower portions of the downhole tool 140, an EM telemetry signal e.g., current) 158 is generated that travels from the lower portion of the downhole tool 140 out into the subterranean formation 132. At least a portion of the EM telemetry signal 158 may reach the surface 102.

One or more sensors (two are shown: 160, 162) may be configured to detect telemetry signals from the downhole tool 140. The sensors 160, 162 may be electrodes, magnetometers, capacitive sensors, current sensors, hall probes, gap electrodes, toroidal sensors, etc. The sensors 160, 162 may be positioned in and/or configured to detect signals from a single wellbore 130 or multiple wellbores. The sensors 160, 162 may operate on land or in marine environments. The sensors 160, 162 may communicate unidirectionally or bi-directionally. The sensors 160, 162 may use automation, downlinking, noise cancellation, etc., and may operate with acquisition software and/or human operators.

Figure 7:
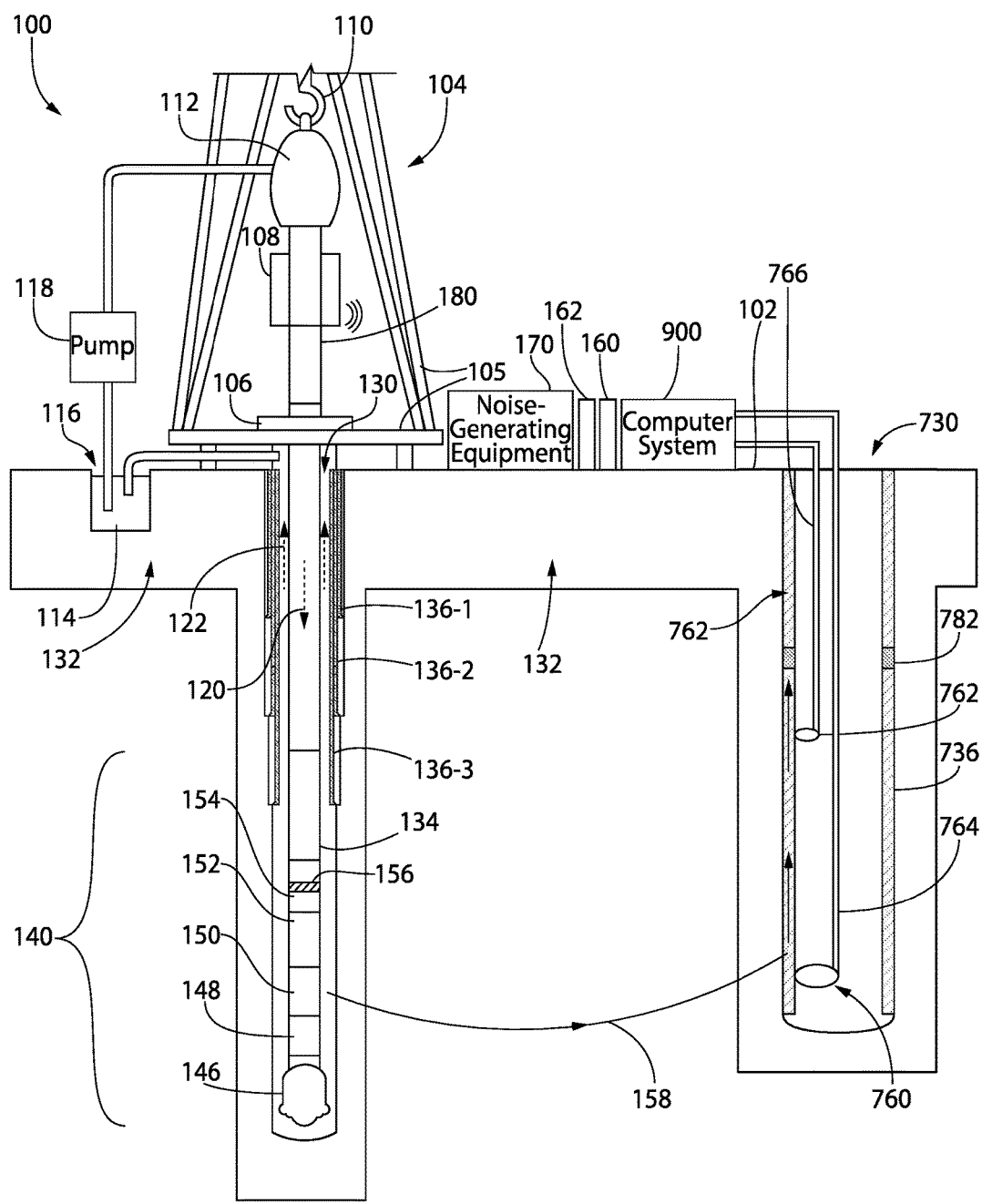
FIG. 7 illustrates a cross-sectional view of the well site system including a second wellbore including a casing having an electrical insulation layer positioned therein, according to an embodiment.

In an example, the sensors 160, 162 may be metal stakes positioned at the surface 102 that are configured to detect part of the EM telemetry signal 158 travelling through the subterranean formation 132 and/or a voltage differential between the sensors 160, 162. In another embodiment, one or more of the sensors 160, 162 may be positioned within the drilling wellbore 130 (e.g., in contact with a casing). In yet another embodiment, one or more of the sensors 160, 162 may be positioned within a different wellbore (as shown in FIG. 7) and configured to sense the EM telemetry signal 158 flowing through the casing in the different wellbore at two different depths or potential differences. The current and/or voltage differential may be measured at the sensors 160, 162 by an ADC connected to the sensors 160, 162. The output of the ADC may be transmitted to a computer system 1700 (see FIG. 17) at the surface 102. By processing of the ADC output, the computer system 1700 may then decode the voltage differential to recover the data transmitted by the MWD tool 154 (e.g., the formation properties, physical properties, etc.).

Noise-generating equipment 170 may also be positioned at the surface 102. The noise-generating equipment 170 may be or include any equipment that is connected to ground through grounding rods or metal structures electrically-connected to the earth. Illustrative noise-generating equipment 170 may be or include motors, generators, control equipment, pumps, rectifiers, pulse width modulation ("PWM") controllers, variable frequency drive ("VFD") controllers, or a combination thereof In some embodiments, the current from the noise-generating equipment 170 may be introduced into the wellbore 130. For example, the noise-generating equipment 170 may be positioned on, or in contact with, one or more metallic structural members 105 that are part of, or at least partially support, the platform and derrick assembly 104, the rotary table 106, the kelly or top drive 108, the hook 110, the swivel 112, or other rig equipment. The current from the noise-generating equipment 170 may flow through the structural members 105 and into the drill string 134. In another embodiment, the current the noise-generating equipment 170 may flow through the structural members 105 and into a casing 136 in the wellbore 130. From there, the current from the noise-generating equipment 170 may be introduced into the subterranean formation 132 at one or more contact points between the drill string 134 and/or casing 136 and the subterranean formation 132. At least a portion of this current from the noise-generating equipment 170 may flow through the subterranean formation 132 to the surface 102 and be detected by the sensors 160, 162. The current from the noise-generating equipment 170 may interfere with the current transmitted from the downhole tool 140 (e.g., carrying the encoded formation properties, physical properties, etc.). As a result, the computer system 900 may have difficulty distinguishing which portions of the sensed current are carrying the encoded data and which portions are simply noise.

To reduce the amount of current from the noise-generating equipment 170 that is introduced into the wellbore 130 and generates the noise, another electrical insulation layer 182 may be used. In the embodiment shown in FIG. 1, the insulation layer 182 may be positioned in a saver sub 180 that is coupled to and positioned between the kelly or top drive 108 and the drill string 134. As a result, in some embodiments, the insulation layer 182 may be positioned above the surface 102 and/or the subterranean formation 132. The current from the noise-generating equipment 170 may be unable to flow through the insulation layer 182 in the saver sub 180. As a result, the current from the noise-generating equipment 170 may be unable to flow through the saver sub 180 and into the drill string 134 and/or the casing 136, thus reducing the interference seen at the sensors 160, 162.

The saver sub 180 may include a body that is a hollow, metallic tubular member (e.g., a drill collar). The body may include a first (e.g., upper) portion and a second (e.g., lower) portion. The upper portion of the saver sub 180 may coupled to the kelly or top drive 108 via a threaded connection, and the lower portion of the saver sub 180 may be coupled to the drill string 134 via a threaded connection. When additional tubular members are added to the drills string 134 to increase the length of the drill string 134, the lower portion of the saver sub 180 may be uncoupled (e.g., unscrewed) from the drill string 134, while the upper portion of the saver sub 180 may remain coupled to the kelly or top drive 108. Thus, the connection between the upper portion of the saver sub 180 and the kelly or top drive 108 may not be used often, and as a result, suffers minimal wear and tear. The connection between the lower portion of the saver sub 180 and the drill string 134, however, may suffer greater wear and tear due to repeated use. When the connection between the lower portion of the saver sub 180 and the drill string 134 becomes too worn down, the saver sub 180 may be discarded and replaced with a new saver sub 180.

Figure 2:
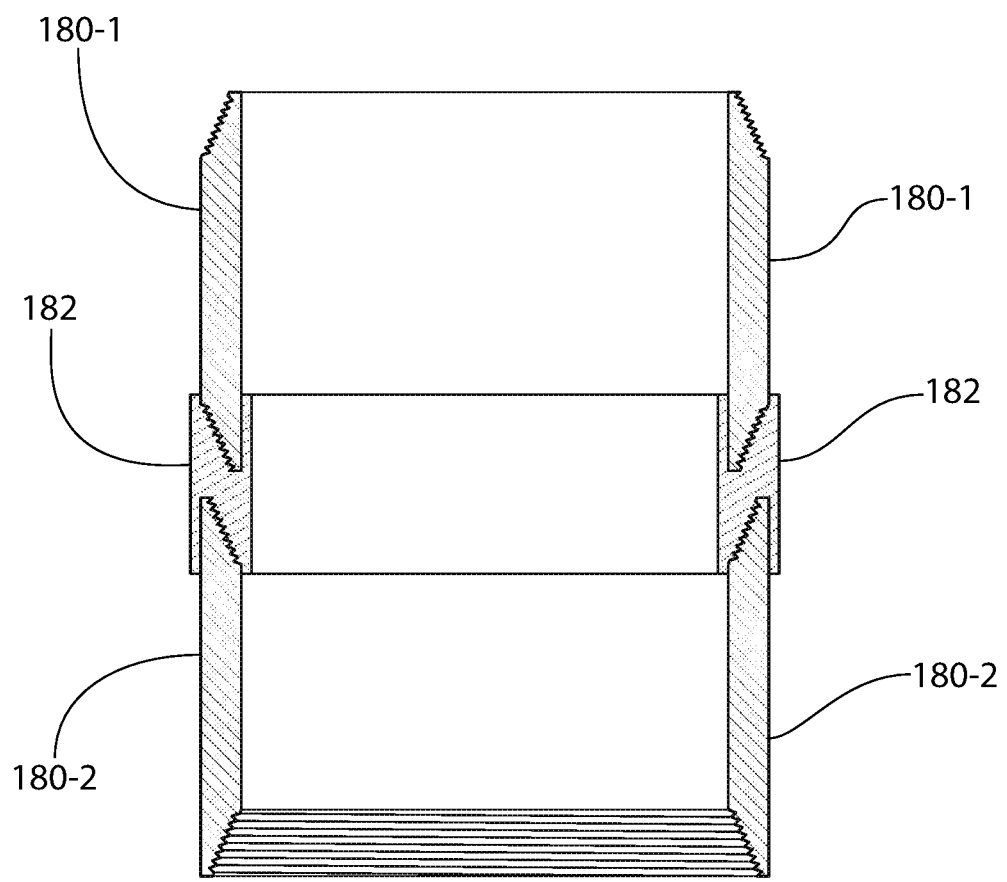
FIG. 2 illustrates an enlarged cross-sectional view of the saver sub including the electrical insulation layer, according to an embodiment.

FIG. 2 illustrates an enlarged cross-sectional view of the electrical insulation layer 182 in the saver sub 180, according to an embodiment. The insulation layer 182 may be positioned between the upper portion of the saver sub 180-1 and the lower portion of the saver sub 180-2. In one embodiment, the upper portion of the saver sub 180-1 may be engaged with the lower portion of the saver sub 180-2 via a threaded connection, and the insulation layer 182 may be a coating or an insert on the (e.g., axial) surfaces of the threaded connection, the outer (e.g., radial) surface of the saver sub 180 proximate to the threaded connection, the inner (e.g., radial) surface of the saver sub 180 proximate to the threaded connection, or a combination thereof.

The insulation layer 182 may have a thickness ranging from a fraction of a millimeter to several centimeters. For example, the thickness may be from about 0.1 mm to about 5 cm or from about 1 mm to about 2 cm. The insulation layer 182 may have a resistance that is less than or equal to about 500ohms ("Ω"), greater than or equal to about 200ohms, or greater than or equal to about 100ohms . The insulation layer 182 may be made from any non-conductive material with sufficient mechanical strength to withstand the downhole torque, such as PEEK®, ceramic, or a combination thereof.

Figure 3:
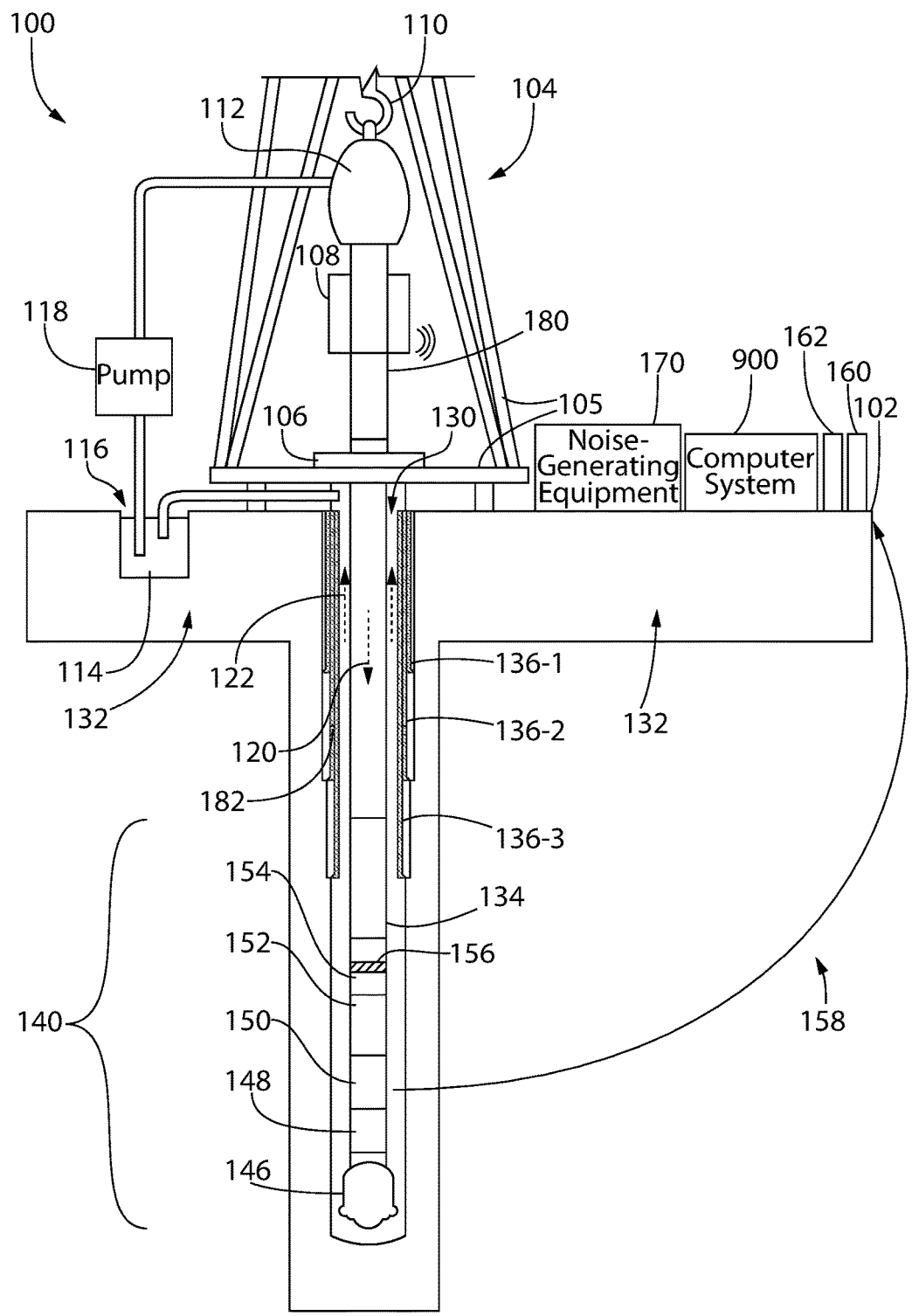
FIG. 3 illustrates a cross-sectional view of the well site system including the electrical insulation layer positioned in a casing in a wellbore, according to an embodiment.

FIG. 3 illustrates a cross-sectional view of the well site system 100 including the electrical insulation layer 182 positioned in the casing 136, according to an embodiment. The casing 136 may include one or more layers (three are shown: 136-1, 136-2, 136-3). Each of the layers 136-1, 136-2, 136-3 may include a body that is a hollow, metallic tubular member. The first layer 136-1 may extend downward from the surface 102. The first layer 136-1 may be coupled to the wall of the wellbore 130 with a layer of cement. The first layer 136-1 may be referred to as the "conductor casing." The second layer 136-2 may extend downward from the surface location 102 a greater depth than the first layer 136-1 and be positioned radially-inward from the first layer 136-1. The second layer 136-2 may be referred to as the "surface casing." The third layer 136-3 may extend downward from the surface 102 a greater depth than the second layer 136-2 and be positioned radially-inward from the second layer 136-2 (and radially-outward from the drill string 134). The third layer 136-3 may be referred to as the "intermediate casing." Although three layers 136-1, 136-2, 136-3 are shown, as will be appreciated, in other embodiments, more or fewer layers may be used. Instead of, or in addition to, the insulation layer 182 being positioned within the saver sub 180, in some embodiments, the insulation layer 182 may be positioned within one or more of the layers of the casing 136-1, 136-2, 136-3.

Figure 4:
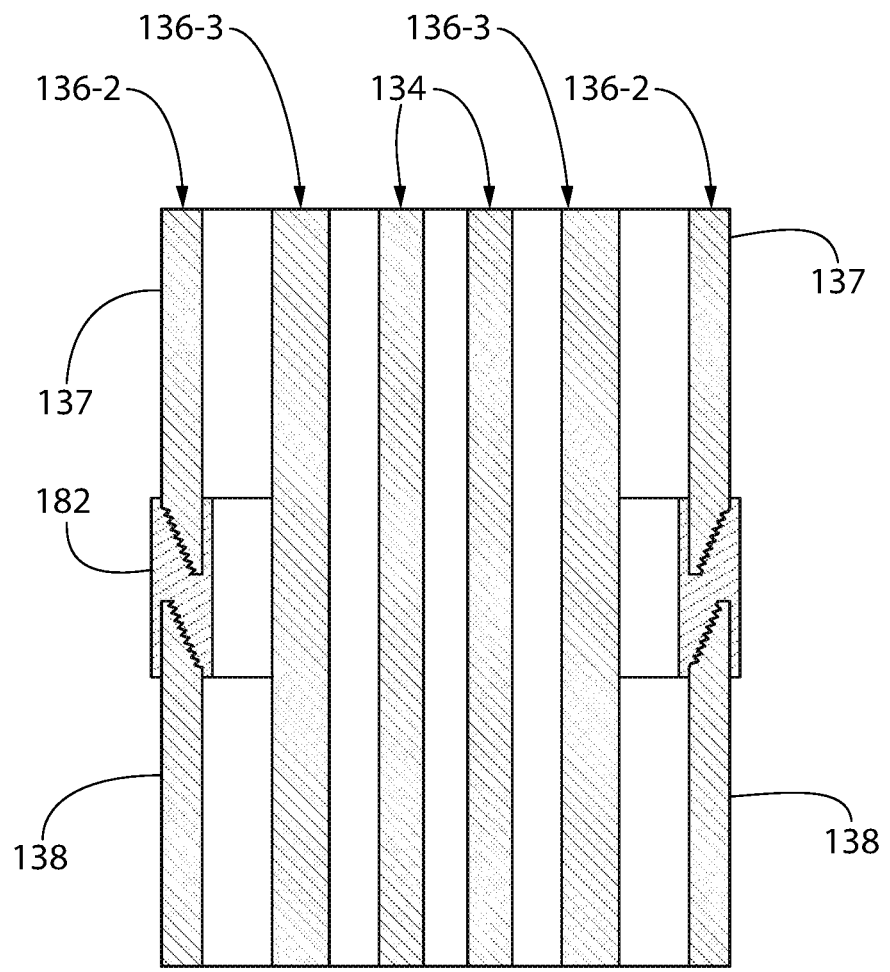
FIG. 4 illustrates an enlarged cross-sectional view a portion of the casing including the electrical insulation layer, according to an embodiment.

FIG. 4 illustrates an enlarged cross-sectional view of a portion of the casing 136 including the electrical insulation layer 182, according to an embodiment. As shown, the insulation layer 182 may be positioned within the surface casing 136-2. For example, a first (e.g., upper) portion 137 of the surface casing 136-2 may be engaged with a second (e.g., lower) portion 138 of the surface casing 136-2 via a threaded connection, and the insulation layer 182 may be a coating or insert on the axial surfaces of the threaded connection, the outer radial surface of the surface casing 136-2 proximate to the threaded connection, the inner radial surface of the surface casing 136-2 proximate to the threaded connection, or a combination thereof. The current from the noise-generating equipment 170 may be unable to flow through the insulation layer 182 in the surface casing 136-2. As a result, the current from the noise-generating equipment 170 may be unable to flow through the surface casing 136-2, thus reducing the interference seen at the sensors 160, 162.

In other embodiments, the insulation layer 182 may be positioned within the conductor casing 136-1 or the intermediate casing 136-3. In yet other embodiments, multiple insulation layers 182 may be used. For example, a first insulation layer 182 may be positioned within the conductor casing 136-1, a second insulation layer 182 may be positioned within the surface casing 136-2, and a third insulation layer 182 may be positioned within the intermediate casing 136-3. The insulation layer 182 may be positioned below the surface 102 (i.e., in the wellbore 130) because the casing 136 is positioned in the wellbore 130. A distance between the surface 102 and the insulation layer 182 may be from about 0.1 m to about 50 m or from about 1 m to about 20 m.

Figure 5:
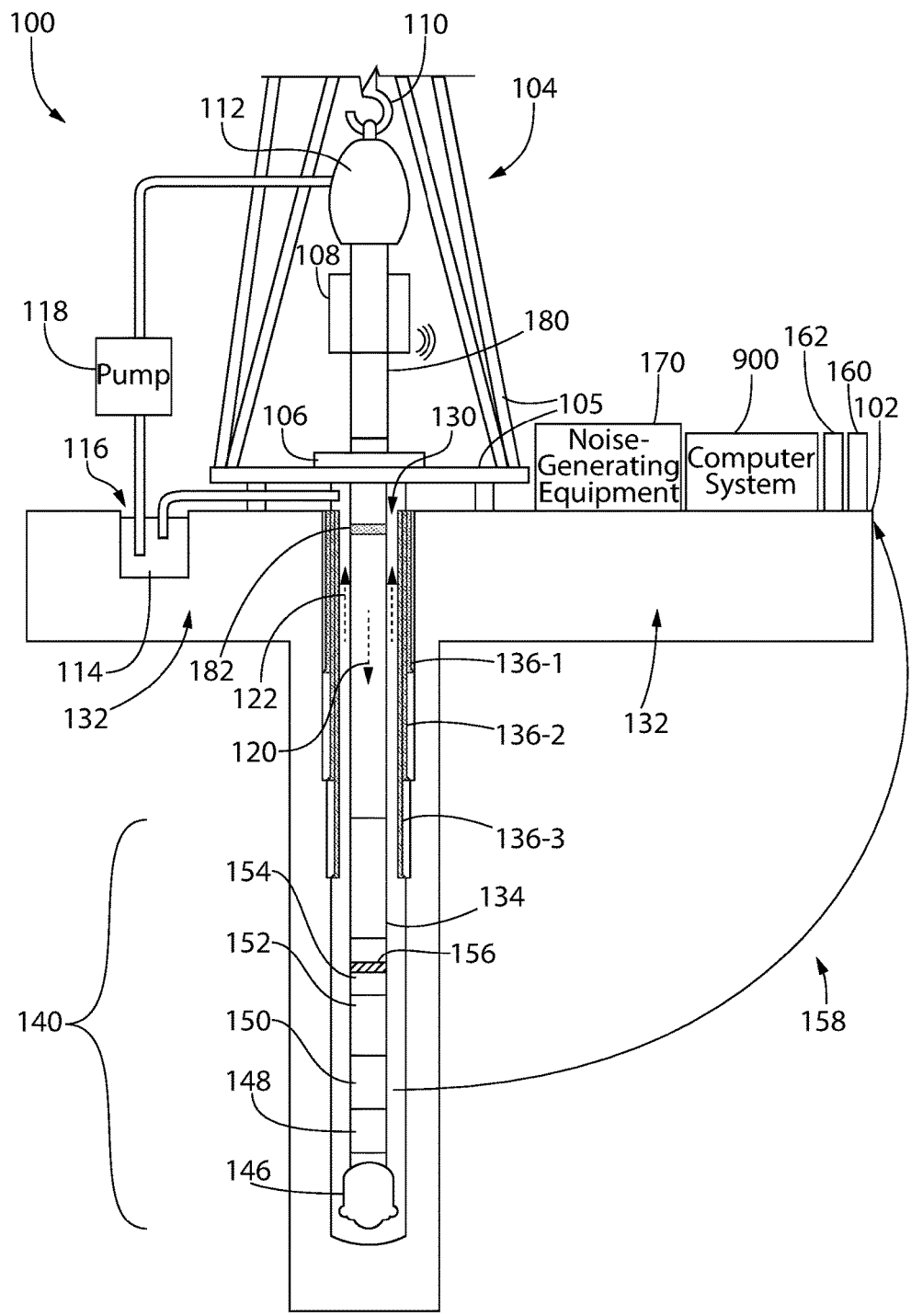
FIG. 5 illustrates a cross-sectional view of the well site system including the electrical insulation layer positioned in a drill string in the wellbore, according to an embodiment.

FIG. 5 illustrates a cross-sectional view of the well site system 100 including the electrical insulation layer 182 positioned in the drill string 134, according to an embodiment. Instead of, or in addition to, the insulation layer 182 being positioned within the saver sub 180 or the casing 136, in some embodiments, the insulation layer 182 may be positioned within one or more segments of the drill string 134.

In one embodiment, the insulation layer 182 may be positioned above the surface 102. In other embodiments, the insulation layer 182 may be positioned below the surface 102. When the portion/segment of the drill string 134 having the insulation layer 182 is below the surface 102 (i.e., in the wellbore 130), a distance between the surface 102 and the insulation layer 182 may be from about 0.1 m to about 50 m or from about 1 m to about 20 m. As will be appreciated, these distances are illustrative, and greater distances are contemplated herein.

Figure 6:
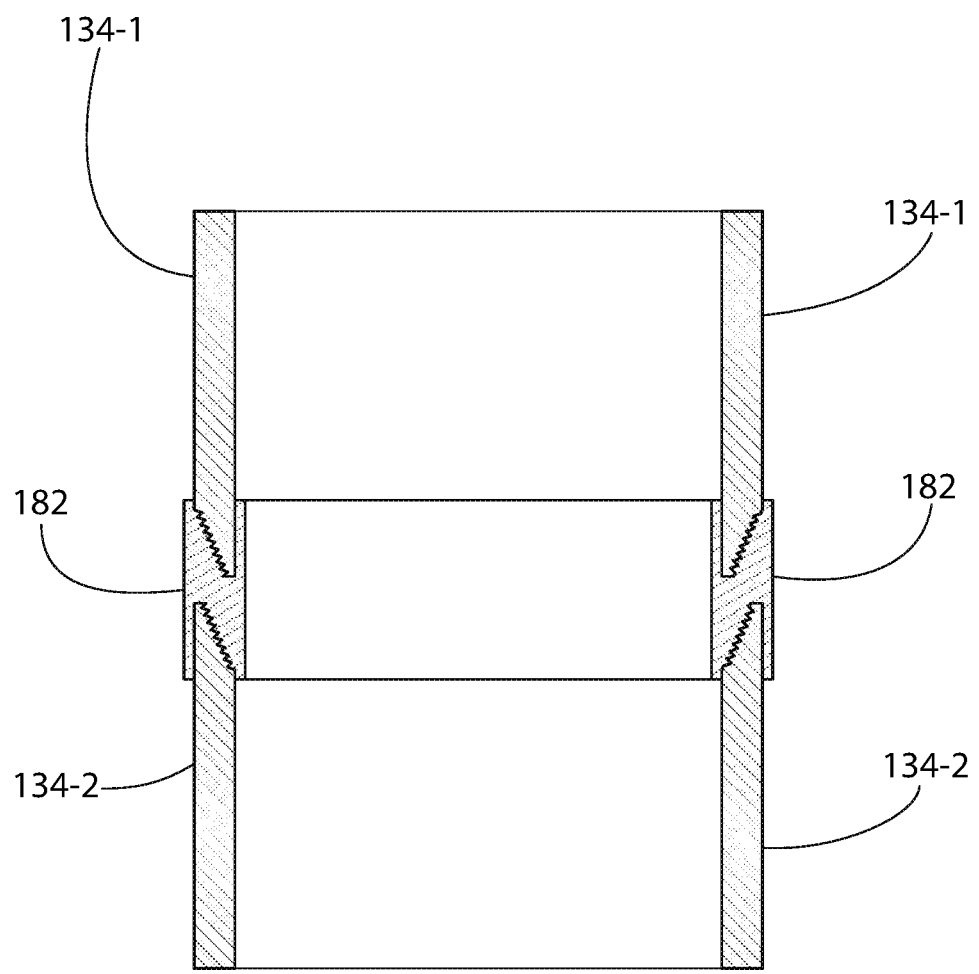
FIG. 6 illustrates an enlarged cross-sectional view of a portion of the drill string including the electrical insulation layer, according to an embodiment.

FIG. 6 illustrates an enlarged cross-sectional view of a portion of the drill string 134 including the electrical insulation layer 182, according to an embodiment. As shown, a first (e.g., upper) portion/segment of the drill string 134-1 may be engaged with a second (e.g., lower) portion/segment of the drill string 134-2 via a threaded connection, and the insulation layer 182 may be a coating or insert on the axial surfaces of the threaded connection, the outer radial surface of the drill string 134 proximate to the threaded connection, the inner radial surface of the drill string 134 proximate to the threaded connection, or a combination thereof. The current from the noise-generating equipment 170 may be unable to flow through the insulation layer 182 in the drill string 134. As a result, the current from the noise-generating equipment 170 may be unable to flow through the drill string 134, thus reducing the interference seen at the sensors 160, 162.

FIG. 7 illustrates a cross-sectional view of the well site system 100 including a second wellbore 730 having a casing 736 having an electrical insulation layer 782 positioned therein, according to an embodiment. As shown, the EM telemetry signal 158 generated by the downhole tool 140 travels through the subterranean formation 132. At least a portion of the EM telemetry signal 158 may reach the second wellbore 730, which may be laterally-offset from the first wellbore 130. For example, the distance between the first and second wellbores 130, 730 may be from about 10 m to about 50 m, about 50 m to about 100 m, about 100 m to about 500 m, or more.

The EM telemetry signal 158 flowing through the casing 736 in the second wellbore 730, which offers the path of least resistance, may find a return path back to the downhole tool 140 (e.g., above insulation layer 156) through the subterranean formation 132 or a conductor connecting the casing 736 to the derrick assembly 104. The EM telemetry signal 158 flowing through the casing 736 in the second wellbore 730 produces a voltage that can be sensed with a differential measurement between two points along the length of the casing 736. In one embodiment a first sensor (e.g., a "deep electrode") 760 may be placed proximate to the bottom of the vertical interval of the second wellbore 730, and a second sensor 762 may be placed in the second wellbore 730 above the first sensor 760 (i.e., closer to the surface 102). A distance between the first and second sensors 760, 762 may be from about 50 m to about 100 m, about 100 m to about 500 m, about 500 m to about 1000 m, or more. For example, the distance may be greater than or equal to about 100 m.

The sensors 760, 762 may be electrodes, magnetometers, capacitive sensors, current sensors, hall probes, gap electrodes, toroidal sensors, etc. The sensors 760, 762 may be positioned in and/or configured to detect signals from the first wellbore 130. The sensors 760, 762 may operate on land or in marine environments. The sensors 760, 762 may communicate uni-directionally or bi-directionally. The sensors 760, 762 may use automation, downlinking, noise cancellation, etc., and may operate with acquisition software and/or human operators.

The sensors 760, 762 may be connected to a computer system, such as the computer system 900 described below with reference to FIG. 9, at the surface via shielded cables 764, 766. On the surface 102, a current and/or voltage differential measured by the sensors 760, 762 may be amplified by a differential amplifier with high common mode rejection ratio, which removes common mode noise. The computer system 900 may then decode the voltage differential to recover the data (e.g., the formation properties, physical properties, etc.).

In one embodiment, at least some of the noise current generated by the noise-generating equipment 170 may travel down the casing 736 in the second wellbore 730 toward the sensors 760, 762. The noise current may be reduced by placing an electrical insulation layer 782 in the casing 736 a predetermined distance below the surface 102, but above the first and second sensors 760, 762. The predetermined distance may be from about 10 m to about 50 m, about 20 m to about 100 m, about 50 m to about 200 m, or more. The electrical insulation layer 782 may reduce or prevent noise current from traveling down the casing 736 to reach the sensors 760, 762. The electrical insulation layer 782 in the casing 736 may be similar to the electrical insulation layer 182 described above with reference to FIGS. 3 and 4.

Figure 8:
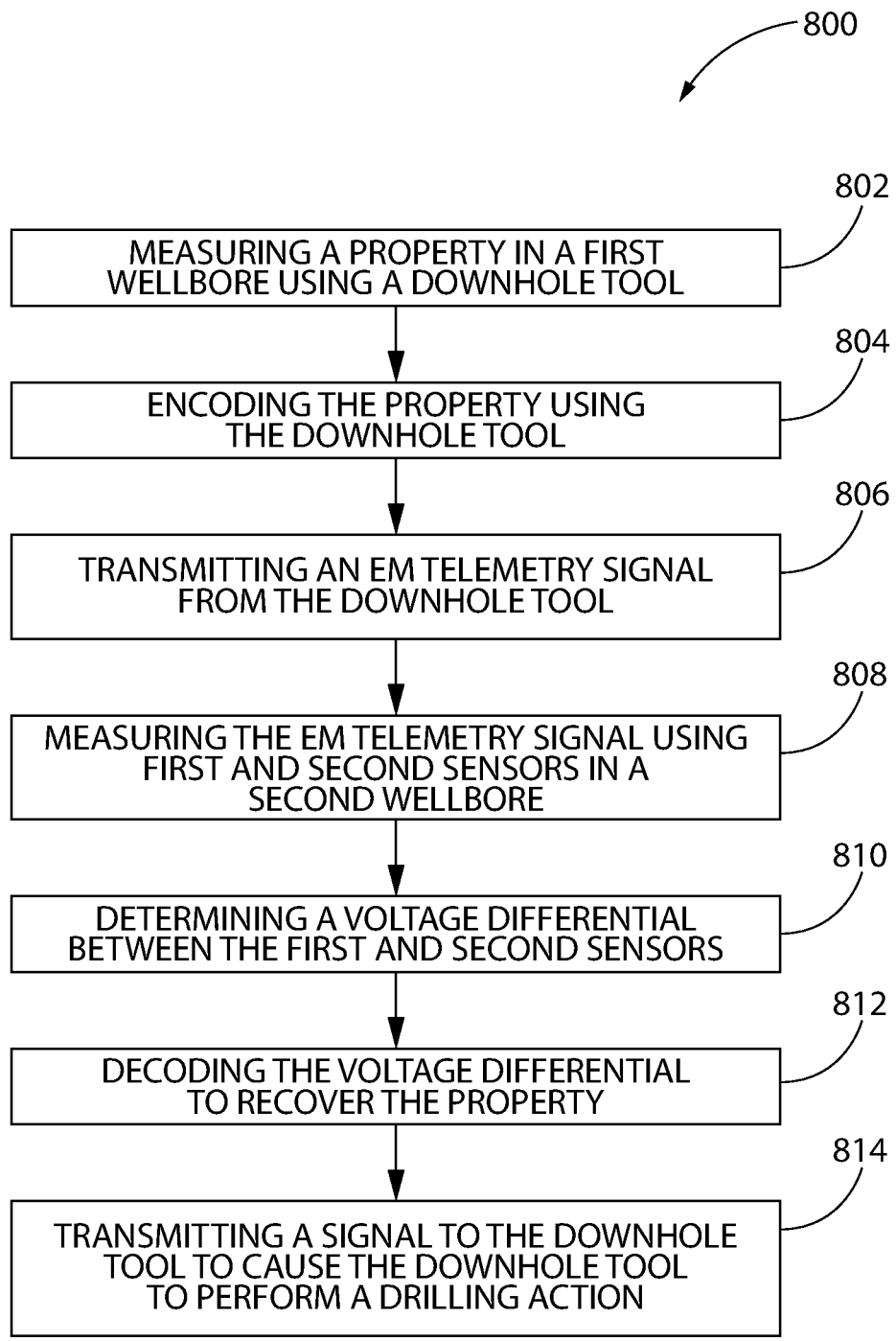
FIG. 8 illustrates a flowchart of a method for recovering data from a downhole tool in a wellbore, according to an embodiment.

FIG. 8 illustrates a flowchart of a method 800 for recovering data from a downhole tool 140 in a first wellbore 130, according to an embodiment. The method 800 may include measuring a property in the first wellbore 130 using the downhole tool 140, as at 802. The method 800 may also include encoding the property using the downhole tool 140, as at 804. The method 800 may also include transmitting an EM telemetry signal 158 from the downhole tool 140 into the surrounding subterranean formation 132, as at 806. The EM telemetry signal (e.g., the current) 158 may have the property encoded therein.

The method 800 may also include measuring the EM telemetry signal 158 using first and second sensors 760, 762, as at 808. At least one of the first and second sensors 760, 762 may be positioned in the second wellbore 730. For example, both sensors 760, 762 may be positioned in the second wellbore 730 and axially-offset from one another.

The first and second sensors 760, 762 may be in contact with the casing 736 in the second wellbore 730 or in contact with an intermediate conductive member that is in contact with the casing 736, to enable the first and second sensors 760, 762 to measure the differential voltage between the sensors 760, 762.

The method 800 may also include determining the differential voltage between the first and second sensors 760, 762, as at 810. More particularly, the differential voltage is the product of the current flowing in the casing 736 times the resistance of the casing 736 (i.e., Ohm's law). The differential voltage may be found using:

$$\Delta V = \Delta I * R \quad (1)$$

$$\Delta I = I_2 - I_1 \quad (2)$$

where $\Delta V$ refers to the voltage differential, $\Delta I$ refers to the current differential between the first and second sensors 760, 762, $I_1$ refers to the current measured by the first sensor 760, $I_2$ refers to the current measured by the second sensor 762, and R refers to the resistance of the casing 736 between the first and second sensors 760, 762. When the first and second sensors 760, 762 are both in contact with the casing 736 in the second wellbore 730, the resistance may be dependent upon the length of the casing 736 between the first and second sensors 760, 762 and the conductivity of the casing material. In at least one embodiment, the resistance between the first and second sensors 760, 762 may be from about 1 ohm to about 100 ohms, about 5 ohms to about 75 ohms, or about 10 ohms to about 40 ohms. For example, the resistance may be less than or equal to about 25 ohms.

The method 800 may also include decoding the voltage differential to recover the property, as at 812. The computer system 900 may be used to decode the differential voltage. Decoding the voltage differential may include running a noise-cancelation algorithm. The method 800 may also include, in response to decoding the property, transmitting a signal to the downhole tool 140 to cause the downhole tool 140 to perform a drilling action, as at 814. The drilling action may include varying a trajectory of the downhole tool 140 (e.g., to steer the downhole tool 140 into a pay zone layer). In another embodiment, the drilling action may include varying a weight-on-bit ("WOB") of the downhole tool 140 at one or more locations in the subterranean formation 132. In another embodiment, the drilling action may include varying a flow rate of fluid being pumped into the first wellbore 130. In another embodiment, the drilling action may include varying a type (e.g., composition) of the fluid being pumped into the first wellbore 130. In another embodiment, the drilling action may include measuring one or more additional properties in the subterranean formation 132 using the downhole tool 140.

In some embodiments, it may be possible to receive a weak uplink EM telemetry signal from the downhole tool 140 while at the same time a stronger downlink EM telemetry signal is simultaneously sent to the downhole tool 140 from the surface 102 (e.g., a command). This presents a challenge in conventional EM telemetry because the downlink EM telemetry signal may be directly coupled to the uplink EM telemetry signal as the surface stakes are used to both transmit and receive. The system and method described above, however, reduces the cross-coupling of the weak uplink EM telemetry signal from the strong downlink EM telemetry signal.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 900 contains one or more telemetry module(s) 908. The telemetry module(s) 908 may be used to perform at least a portion of one or more embodiments of the methods disclosed herein (e.g., method 800).

Figure 9:
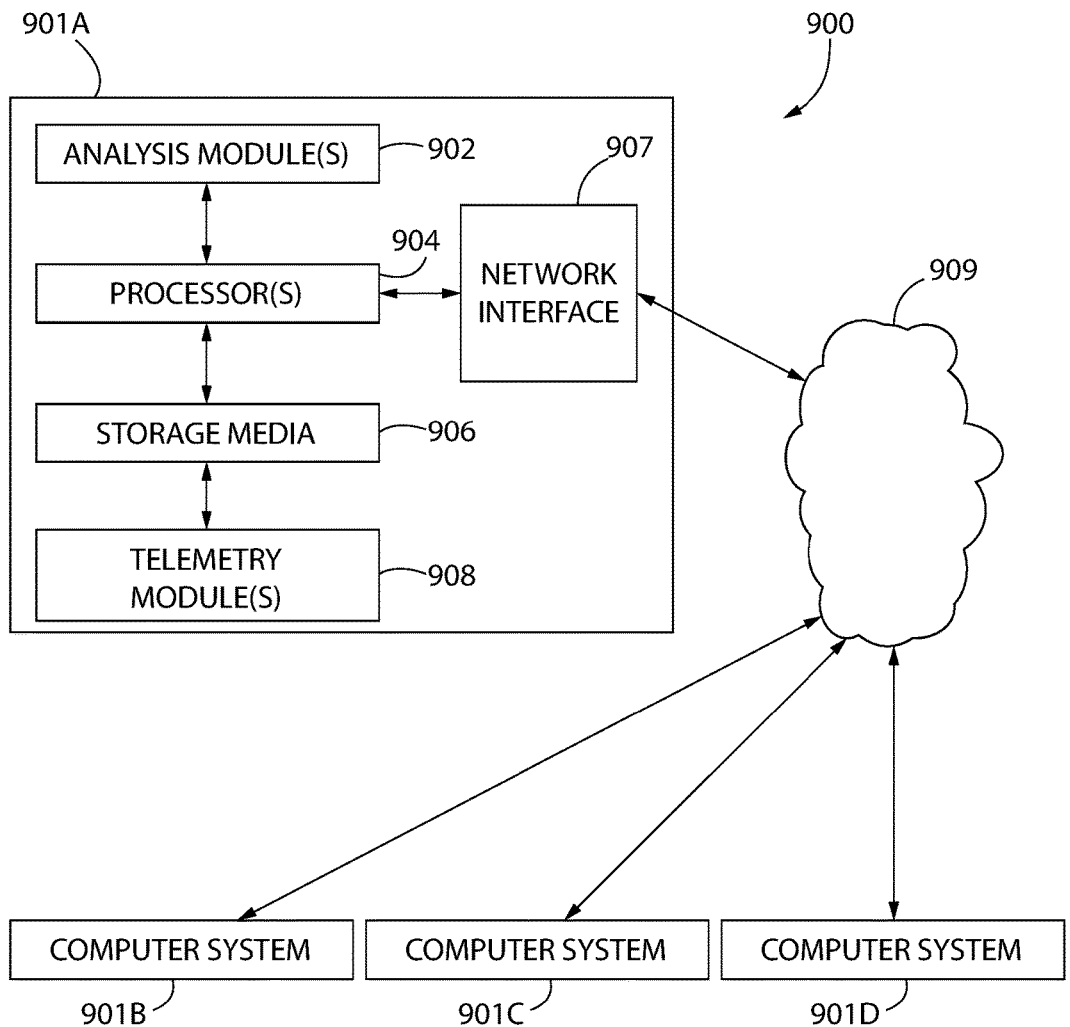
FIG. 9 illustrates a schematic view of a computer system for performing at least a portion of the method, according to an embodiment.

It should be appreciated that computing system 900 is one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A saver sub, comprising:
a hollow, tubular body having an upper portion and a lower portion, wherein the upper portion remains coupled to a kelly or a top drive as additional tubular members are added to a drill string, and wherein the lower portion is repeatedly coupled and uncoupled to the drill string as the additional tubular members are added to the drill string; and
an insulation layer positioned between the upper portion and the lower portion, the insulation layer being coupled to the upper portion with a first threaded connection and the lower portion with a second threaded connection.

2. The saver sub of claim 1, wherein the insulation layer has a resistance that is between 200 ohms and 500 ohms.

3. The saver sub of claim 2, wherein the insulation layer has a thickness from about 0.1 mm to about 5 cm.

4. The saver sub of claim 1, wherein at least a portion of the insulation layer is disposed on an axial surface of the upper portion that at least partially defines the first threaded connection.

5. The saver sub of claim 1, wherein at least a portion of the insulation layer is disposed on an inner radial surface of the upper portion proximate to the first threaded connection.

6. The saver sub of claim 1, wherein at least a portion of the insulation layer is disposed on an outer radial surface of the upper portion proximate to the first threaded connection.

7. The saver sub of claim 1, wherein the saver sub is positioned above a subterranean formation when the saver sub is coupled to the kelly or the top drive.

8. The saver sub of claim 7, wherein the insulation layer substantially prevents current from noise-generating equipment at a surface from being transmitted into a wellbore.

9. A casing, comprising:
a first casing including a hollow, tubular body being coupled to a wall of a wellbore with a layer of cement, wherein the hollow, tubular body includes an upper portion and a lower portion; and
an insulation layer positioned between the upper portion and the lower portion, the insulation layer being coupled to the upper portion with a first threaded connection and the lower portion with a second threaded connection.

10. The casing of claim 9, wherein the insulation layer has a resistance that is between 200 ohms and 500 ohms.

11. The casing of claim 10, wherein the insulation layer is positioned within the wellbore.

12. The casing of claim 11, wherein the insulation layer is permanently positioned between 0.1 meters and 50 meters below the surface.

13. The casing of claim 9, wherein at least a portion of the insulation layer is disposed on at least one of:
an axial surface of the upper portion that at least partially defines the first threaded connection,
an inner radial surface of the upper portion proximate to the first threaded connection, or
an outer radial surface of the upper portion proximate to the first threaded connection.

14. The casing of claim 9, further comprising a second casing, the first casing being internal to the second casing.

15. The casing of claim 14, wherein the second casing includes a second upper portion and a second lower portion, a second insulation layer positioned between the second upper portion and the second lower portion.

16. A drill string segment, comprising:
a hollow, tubular body having an upper portion and a lower portion, wherein the upper portion is configured to be coupled to a saver sub, a kelly, or a top drive; and
an insulation layer including an insulation layer inner radial surface and an insulation layer outer radial surface, the insulation layer being positioned between the upper portion and the lower portion, the insulation layer including:
a first threaded connection on the insulation layer inner radial surface, the first threaded connection coupling with the upper portion at an upper portion outer radial surface; and
a second threaded connection on the insulation layer outer radial surface, the second threaded connection coupling with the lower portion at a lower portion inner radial surface.

17. The drill string segment of claim 16, wherein the lower portion is configured to be coupled to another drill string segment.

18. The drill string segment of claim 17, wherein the insulation layer is positioned within a wellbore.

19. The drill string segment of claim 16, wherein at least a portion of the insulation layer is disposed on at least one of:
an axial surface of the upper portion that at least partially defines the first threaded connection,
an inner radial surface of the upper portion proximate to the first threaded connection, or
an outer radial surface of the upper portion proximate to the first threaded connection.

20. The drill string segment of claim 16, wherein the hollow, tubular body is located in a first wellbore, and further comprising a first sensor and a second sensor located in a second wellbore, the first sensor and the second sensor being positioned in contact with a casing in the second wellbore and configured to receive an electromagnetic signal originating from the first wellbore.

21. A method for recovering data from a downhole tool that is in a first wellbore, comprising:
- measuring an electromagnetic signal using first and second sensors, wherein at least a portion of the electromagnetic signal is transmitted by the downhole tool positioned in the first wellbore, wherein the first and second sensors are each positioned in contact with a casing in a second wellbore, and wherein the casing comprises an insulation layer that is positioned above the first and second sensors; and
- decoding the electromagnetic signal measured by the first and second sensors to recover a property measured by the downhole tool.

22. The method of claim 21, wherein the casing comprises a hollow, tubular body configured to be coupled to a wall of the second wellbore with a layer of cement, wherein the body includes an upper portion and a lower portion, wherein the insulation layer is positioned between the upper portion and the lower portion, and wherein the insulation layer has a resistance that is greater than or equal to about 200 ohms.

23. The method of claim 21, wherein the first and second sensors are spaced apart by a distance that is greater than or equal to about 100 m.

24. The method of claim 21, wherein decoding the electromagnetic signal comprises running a noise-cancelation algorithm.

25. The method of claim 21, wherein, in response to recovering the property, the method comprises transmitting a signal to the downhole tool to cause the downhole tool to perform a drilling action.

* * * * *